United States Patent
Hayashi et al.

(10) Patent No.: US 11,352,058 B2
(45) Date of Patent: Jun. 7, 2022

(54) VEHICLE TRAVELING CONTROLLER

(71) Applicant: TOYOTA JIDOSHA KABUSHIKI KAISHA, Toyota (JP)

(72) Inventors: Yutaro Hayashi, Sunto-gun (JP); Yoshinori Watanabe, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 16/364,442

(22) Filed: Mar. 26, 2019

(65) Prior Publication Data

US 2019/0315404 A1 Oct. 17, 2019

(30) Foreign Application Priority Data

Apr. 13, 2018 (JP) .............................. JP2018-077803

(51) Int. Cl.
*B62D 15/02* (2006.01)
*B62D 6/00* (2006.01)

(52) U.S. Cl.
CPC ........... *B62D 15/025* (2013.01); *B62D 6/008* (2013.01)

(58) Field of Classification Search
CPC .............................. B62D 15/025; B62D 6/008
See application file for complete search history.

(56) References Cited

U.S. PATENT DOCUMENTS

| | | | |
|---|---|---|---|
| 9,604,670 B2 * | 3/2017 | Taniguchi | .............. B62D 6/008 |
| 2009/0319113 A1 | 12/2009 | Lee | |
| 2015/0344068 A1* | 12/2015 | Taniguchi | .............. B62D 6/003 |
| | | | 701/41 |

FOREIGN PATENT DOCUMENTS

| | | | |
|---|---|---|---|
| JP | 2001-48034 A | * | 2/2001 |
| JP | 2010-049535 A | | 3/2010 |
| JP | 2013-184590 A | | 9/2013 |
| JP | 6007521 B2 | * | 10/2016 |

OTHER PUBLICATIONS

Machine Translation of Hiroki's reference (JP 6007521 B2) (Year: 2016).*

* cited by examiner

*Primary Examiner* — Peter D Nolan
*Assistant Examiner* — Tarek Elarabi
(74) *Attorney, Agent, or Firm* — Sughrue Mion, PLLC

(57) ABSTRACT

A vehicle traveling controller according to the present disclosure performs automatic steering so that a vehicle travels along a target path. The vehicle traveling controller allows a driver to intervene in steering. When the driver intervenes in steering and thereby a traveling position of the vehicle deviates outside from a threshold line set apart from the target path in a lane width direction, the vehicle traveling controller increases a steering reaction force acting on steering operation by the driver.

5 Claims, 7 Drawing Sheets

VEHICLE TRAVELING CONTROLLER

CROSS-REFERENCE TO RELATED APPLICATION

This application claims priority to Japanese Patent Application No. 2018-077803, filed on Apr. 13, 2018, which is incorporated by reference herein in its entirety.

BACKGROUND

Field

The present disclosure relates to a vehicle travelling controller, especially a vehicle traveling controller that performs automatic steering so that a vehicle travels along a target path.

Background Art

As disclosed in US2009/0319113A for example, various methods to make a vehicle travel along a target path (for example, a center line of a lane) are proposed. As one of such methods, it is known, in a case where a traveling position of the vehicle deviates from the target path, to generate a traveling track toward the target path from the current position of the vehicle and return the vehicle to the target path by making the vehicle track the traveling track.

SUMMARY

One of the reason why the traveling position of the vehicle deviates from the target path is an intervention by the driver in steering. A deviation of the traveling position of the vehicle may cause danger. Therefore, if the deviation of the traveling position of the vehicle is due to the intervention by the driver in steering, it is required to call the driver's attention. However, depending on how to call the driver's attention, the driver feels annoyed.

The present disclosure has been devised in view of such problems, and an object of the present disclosure is to provide a vehicle travelling controller capable of calling the driver's attention without making the driver feel annoyed when the vehicle under automatic steering may deviate from the target path by the intervention by the driver in steering.

A vehicle travelling controller according to the present disclosure is a vehicle travelling controller that performs automatic steering so that a vehicle travels along a target path. The vehicle travelling controller is configured to allow a driver to intervene in steering, and is configured, when the driver intervenes in steering and thereby a traveling position of the vehicle deviates outside from a threshold line, to increase a steering reaction force acting on steering operation by the driver. The threshold line is set apart from the target path in a lane width direction.

According to the vehicle travelling controller configured as above, as the steering reaction force increases when the traveling position of the vehicle deviates outside from the threshold line, it is possible to inform the driver of a deviation of the vehicle from the target path efficiently by the steering reaction force increasing. Also, if the deviation does not exceed the threshold line, there is little risk that the driver feels annoyed with respect to the steering reaction force.

The vehicle travelling controller may be configured to increase the steering reaction force in accordance with the deviation of the traveling position of the vehicle from the threshold line. This makes it possible to call the driver's attention strongly as the deviation from the target path becomes large.

The vehicle travelling controller may comprise, as means for realizing the above functions, a traveling track generation unit that generates a traveling track for converging the traveling position of the vehicle to the target path, and a tracking control unit that performs tracking control to make the vehicle track the traveling track. The traveling track generation unit generates the traveling track on the basis of the traveling position of the vehicle when the driver intervenes in steering but the traveling position of the vehicle does not deviate outside from the threshold line. Further, the traveling track generation unit generates the traveling track on the basis of a threshold position set on the threshold line when the driver intervenes in steering and thereby the traveling position of the vehicle deviates outside from the threshold line.

When the traveling position of the vehicle is used as the basis of the traveling track, the vehicle doesn't deviate from the traveling track, and thereby the steering reaction force acting on steering operation by the driver by the tracking control is suppressed. On the other hand, when the threshold line is used as the basis of the traveling track, the steering reaction force acting on steering operation by the driver by the tracking control increases as the traveling position of the vehicle deviates outside from the threshold line greatly. Therefore, according to the above configuration, until the traveling position of the vehicle deviates outside from the threshold line, it is possible to allow steering operation by the driver, and when the traveling position of the vehicle deviates outside from the threshold line, it is possible to call the driver's attention by the steering reaction force increasing in accordance with the deviation amount.

The traveling track generation unit may be configured, in a case where a direction indicator is operated to a steering direction of the driver, to generate the traveling track on the basis of the traveling position of the vehicle irrespective of a positional relation between the traveling position of the vehicle and the threshold line. When the direction indicator is operated, it can be assumed that the driver is making the traveling position of the vehicle deviate from the target path intentionally. In this case, by generating the traveling track on the basis of the traveling position of the vehicle so as to suppress the steering reaction force acting on steering operation by the driver, the driver can steer the vehicle to the intended direction without being disturbed by the steering reaction force.

The traveling track generation unit may be configured, in a case where a road shape in front of the vehicle is a road shape requiring a lane change from a traveling lane, to generate the traveling track on the basis of the traveling position of the vehicle irrespective of a positional relation between the traveling position of the vehicle and the threshold line. When the traveling position of the vehicle deviates from the target path under the road shape requiring a lane change from the traveling lane, it can be assumed that the deviation is caused by the driver's intention. In this case, by generating the traveling track on the basis of the traveling position of the vehicle so as to suppress the steering reaction force acting on steering operation by the driver, the driver can steer the vehicle to the intended direction without being disturbed by the steering reaction force.

A setting of a position of the threshold line may be changed in accordance with a traveling environment of the vehicle. This makes it possible to change the attention level of calling the driver's attention in accordance with the traveling environment of the vehicle.

As described above, according to the vehicle travelling controller according to the present disclosure, it is possible to call the driver's attention without making the driver feel annoyed when the vehicle under automatic steering may deviate from the target path by the intervention by the driver in steering.

DETAILED DESCRIPTION

Figure 1:
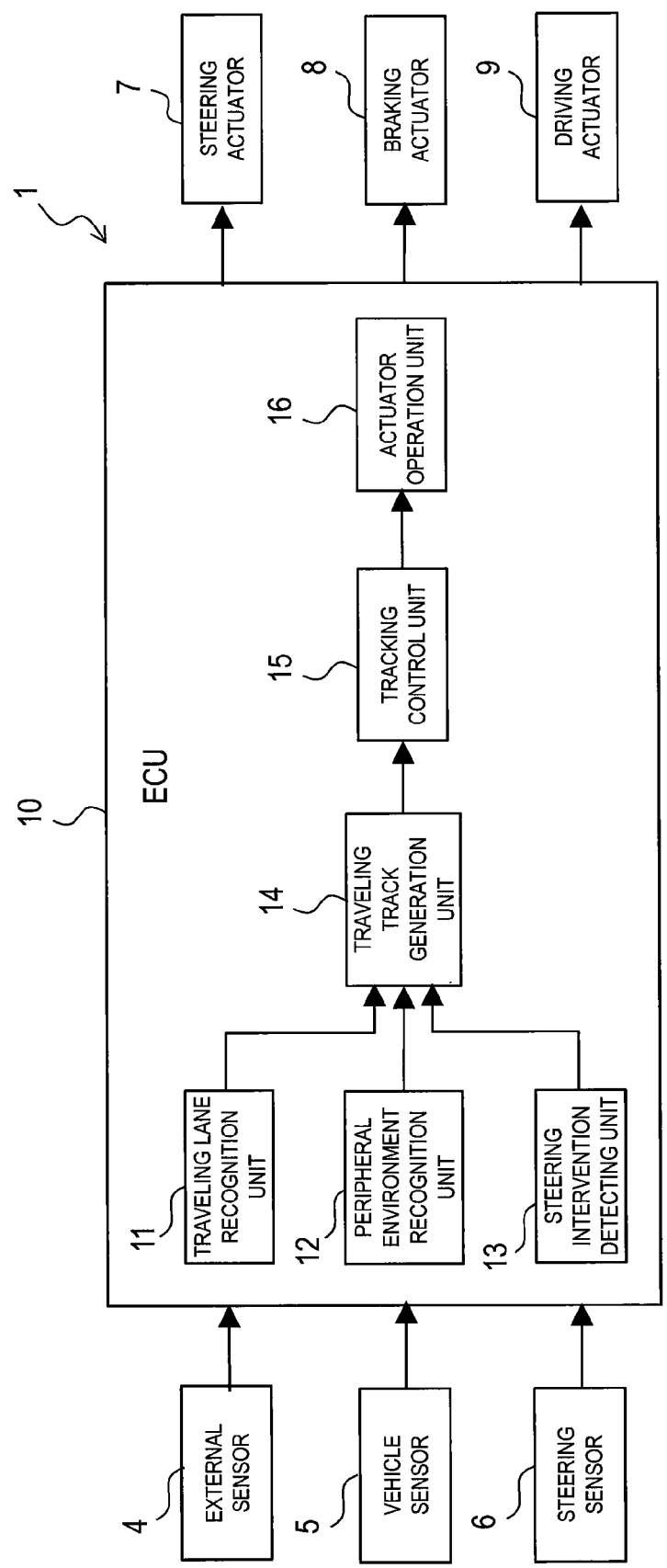
FIG. 1 is a block diagram illustrating a configuration of a control system of an automated driving vehicle equipped with a vehicle travelling controller according to the present disclosure.

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Furthermore, structures and steps that are described in the embodiment shown as follows are not always indispensable to the disclosure unless specially explicitly shown otherwise, or unless the disclosure is explicitly specified by the structures or the steps theoretically.

1. Configuration of Control System of Automated Driving Vehicle

The vehicle traveling controller according to the present embodiment is a vehicle traveling controller for automated driving, and is installed in an automated driving vehicle. Also, the vehicle traveling controller is a controller capable of realizing, for example, an automated driving level equal to or more than Level 2 defined by SAE (Society of Automotive Engineers). The automated driving vehicle equipped with the vehicle traveling controller has a control system of which the configuration is illustrated by, for example, a block diagram of FIG. 1.

In the control system of the automated driving vehicle (hereafter, simply referred to as vehicle) 1, various kinds of sensors 4, 5, 6 and various kinds of actuators 7, 8, 9 are connected to the vehicle traveling controller 10. The vehicle traveling controller 10 is configured to fetch signals from the various kinds of sensors 4, 5, 6, obtain operation signals by processing the fetched signals, and operate the various kinds of actuators 7, 8, 9 by the operation signals.

The various kinds of sensors 4, 5, 6 include an external sensor 4 that acquires information on the surrounding environments and peripheral objects of the vehicle 1, a vehicle sensor 5 that acquires information on the motion states of the vehicle 1, a steering sensor 6 that detects a steering operation by the driver. Specifically, the external sensor 4 includes at least a camera that takes an image of an environment in front of the vehicle 1. A millimeter wave radar and a LIDAR (Laser Imaging Detection and Ranging) may be provided as the external sensor 4. The vehicle sensor 5 includes, for example, a vehicle speed sensor that measures the travelling speed of the vehicle 1 from the rotation speed of a wheel, an acceleration sensor that measures the acceleration acting on the vehicle 1, and a yaw rate sensor that measures the turning angular velocity of the vehicle 1. The steering sensor 6 includes, for example, a steering angle sensor that measures the steering angle of a steering shaft and a steering torque sensor that measures the torque acting on the steering shaft. These sensors 4, 5, 6 are connected to the vehicle traveling controller 10 directly or via a communication network such as CAN (Controller Area Network) built in the vehicle 1.

The various kinds of actuators 7, 8, 9 includes a steering actuator 7 for steering the vehicle 1, a braking actuator 8 for decelerating the vehicle 1, and a driving actuator 9 for accelerating the vehicle 1. The steering actuator 7 includes, for example, a power steering system using a motor or hydraulic pressure, and a steer-by-wire steering system. The braking actuator 8 includes, for example, a hydraulic brake and a power regenerative brake. The driving actuator 9 includes, for example, an engine, an EV system, a hybrid system, a fuel cell system and the like.

The vehicle traveling controller 10 is an ECU (Electronic Control Unit) comprising at least one CPU, at least one ROM, and at least one RAM. In the at least one ROM, various kinds of programs for automatic steering and various kinds of date including a map are stored. When at least one program stored in the at least one RAM is loaded on the at least one RAM, and is executed by the at least one CPU, various kinds of functions are realized by the vehicle traveling controller 10. Note that the vehicle traveling controller 10 may be constituted of a plurality of ECUs.

2. Functions of Vehicle Traveling Controller

In FIG. 1, among the functions of the vehicle traveling controller 1, in particular, functions relating to automatic steering are represented by blocks. Other functions of the vehicle traveling controller 1 are omitted in FIG. 1. Hereafter, functions of the vehicle traveling controller 1 will be described.

The vehicle traveling controller 10 has functions for automatically steering so that the vehicle travels along a target path. These functions are realized by a traveling lane recognition unit 11, a peripheral environment recognition unit 12, a steering intervention detection unit 13, a traveling track generation unit 14, a tracking control unit 15 and an actuator operation unit 16 which constitute the vehicle traveling controller 10. However, these units don't exist as hardware in the vehicle traveling controller 10, but are realized by software when the at least one program stored in the at least one ROM is executed by the at least one CPU.

The traveling lane recognition unit 11 processes images taken by a camera included in the external sensor 4 and recognizes a lane marker such as an outside line, a boundary line and a center line. Then, the traveling lane recognition unit 11 recognizes the traveling lane on which the vehicle 1 is travelling, based on the position of the lane marker on a vehicle coordinate system. The vehicle coordinate system is a coordinate system of which the center is set at a reference point set on the vehicle 1. The traveling lane recognition unit 11 sets a target path of the vehicle 1 based on the recognized lane marker. For example, the center line of the traveling lane may be set as the target path of the vehicle 1. In addition, if the vehicle 1 comprises a GPS receiver and a database storing map information, the traveling lane recognition unit 11 may recognize the traveling lane by using GPS positional information and map information and set the target path based on the recognized results.

The peripheral environment recognition unit 12 recognizes an object that exists in the periphery of the vehicle 1. Recognition of a peripheral object is performed by using information acquired from the external sensor 4. The peripheral environment recognition unit 12 performs the recognition of the peripheral object by using at least one of information acquired by the camera, information acquired by the millimeter wave radar, information acquired by the LIDAR and information acquired by multiple sensors in combination by sensor fusion. The peripheral object that is recognized includes a moving object such as a pedestrian, a bicycle and a vehicle, and a stationary object (obstacle) such as a stopped vehicle, a guardrail, a building and a tree.

The steering intervention detection unit 13 detects an intervention by the driver in steering under automated driving. The intervention by the driver in steering is detected by using information acquired by the steering sensor 6. The steering intervention detection unit 13 determines that the driver is intervening in steering, for example, when a steering torque exceeding a predetermined value is continuously measured for a predetermined time by the steering torque sensor. Also, it may be determined that the driver is intervening in steering when a steering operation more than a predetermined angle is measured by the steering angle sensor.

The traveling track generation unit 14 generates a traveling track for converging the traveling position of the vehicle 1 to the target path. Specifically, the traveling track generation unit 14 calculates a traveling track function of which the variable is an elapsed time from the current position. The variable is represented by, for example, the following quintic function. Here, "t" represents time. "y(t)" represents the target lateral position of the vehicle 1 with respect to the target path at time t. "c0", "c1", "c2", "c3", "c4" and "c5" represent coefficients. Note that "lateral position" means the relative position of the vehicle 1 with respect to the target path in the lane width direction.

$$y(t)=c0+c1*t+c2*t^2+c3*t^3+c4*t^4+c5*t^5$$

The traveling track function y(t) is made to move the vehicle 1 from a base point to an end point smoothly. The base point of the traveling track is the current traveling position of the vehicle 1 basically. However, as will be described in detail later, when a predetermined condition is satisfied, the base point of the traveling track is set to a position different from the current traveling position. The end point of the traveling track is set on the target path ahead of the vehicle 1. The distance from the base point to the end point along the target path may be a fixed value, or may be changed, for example, in accordance with the speed of the vehicle 1.

The coefficients c0, c1, c2, c3, c4, c5 of the traveling track function y(t) are determined based on the current conditions of the vehicle 1 and the target conditions of the vehicle 1 at the end point. Specifically, the coefficients c0, c1, c2, c3, c4, c5 for moving the vehicle 1 smoothly from the current position and converging the traveling position of the vehicle 1 to the target path smoothly are calculated by using, for example, the lateral position of the base point with respect to the target path, the current lateral speed of the vehicle 1, the current lateral acceleration of the vehicle 1, the target lateral speed of the vehicle 1 at the end point and the target lateral acceleration of the vehicle 1 as parameters.

In addition, when generating the traveling track, the traveling track generation unit 14 sets a threshold line apart from the target path in a lane width direction. The threshold line is a traveling position at which attention to the driver is begun to be called when the traveling position of the vehicle 1 deviates from the target path due to the steering intervention by the driver. The traveling track generation unit 14 sets the threshold line based on the recognition result by the peripheral environment recognition unit 12. The method of setting the threshold line will be described in detail later.

The tracking control unit 15 performs tracking control for making the vehicle track the traveling track. The tracking control includes feed-forward control. Concretely, in the feed-forward control, a control point on the traveling track (which is a center point if the traveling track is a lane center line) at the time after a predetermined time from the current time is set as a reference point. Then, a feed-forward value of the operation amount of the steering actuator 7 is calculated from a parameter corresponding to the reference point. The parameter that is referred when calculating the feed-forward value includes, for example, a curvature of the traveling track.

The tracking control performed by the tracking control unit 15 includes feed-back control. The feed-back control is, for example, PI control, PD control, or PID control. In the feed-back control, a path of the vehicle 1 is predicted by using such information as vehicle speed, yaw rate and steering angle measured by the vehicle sensor 5. Then, a predicted position and predicted yaw angle of the vehicle 1 at the time after a predetermined time from the current time is calculated based on the predicted path.

In the feed-back control, next, a feed-back correction amount of the operation amount is calculated based on a parameter indicating the magnitude or tendency of the deviation between the reference point on the traveling point and the predicted position of the vehicle 1. The parameter that is referred when calculating the feed-back correction amount includes, for example, a lateral deviation and a yaw angle deviation. The lateral deviation is a deviation in the lane width direction between the reference point and the predicted position of the vehicle 1. The yaw angle deviation is a deviation between the tangent angle of the traveling track at the reference point and the predicted yaw angle of the vehicle 1 at the predicted position. The tracking control unit 15 calculates the sum of the feed-forward value and the feed-back correction amount as the operation amount of the steering actuator 7.

The actuator operation unit 16 operates the steering actuator 7 by using the operation amount calculated by the tracking control unit 15. As described above, the operation amount includes the feed-forward value and the feed-back correction amount. If the feed-back correction amount is generated by the deviation of the traveling position of the vehicle 1 from the traveling track due to the steering intervention by the driver, the steering force of the steering actuator 7 generated by the feed-back correction amount acts on steering operation by the driver as a steering reaction force.

3. How to Generate Traveling Track and Effect Thereof

Figure 2:
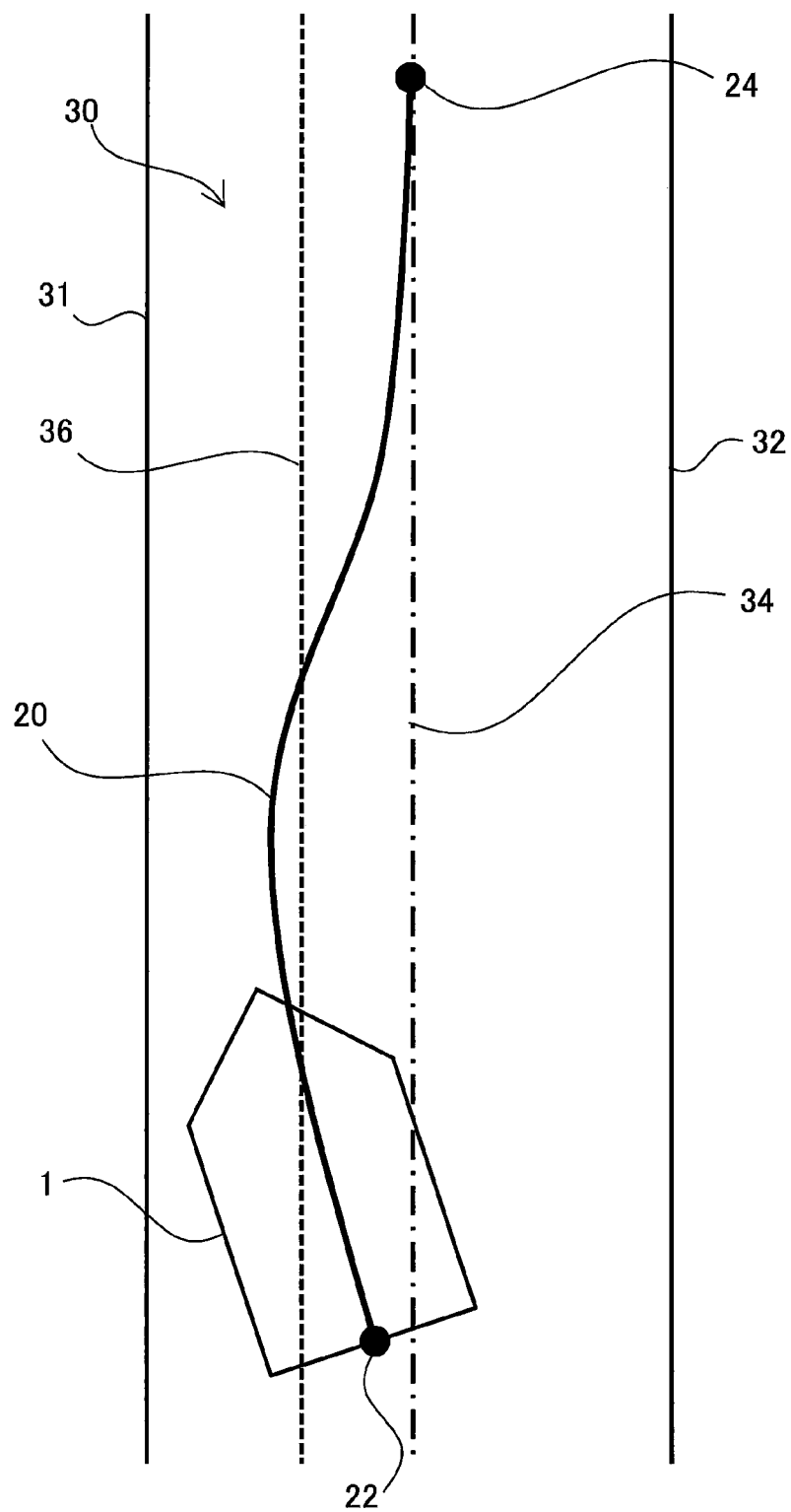
FIGS. 2 and 3 are diagrams illustrating how to generate a traveling track and the effect thereof.
Figure 3:
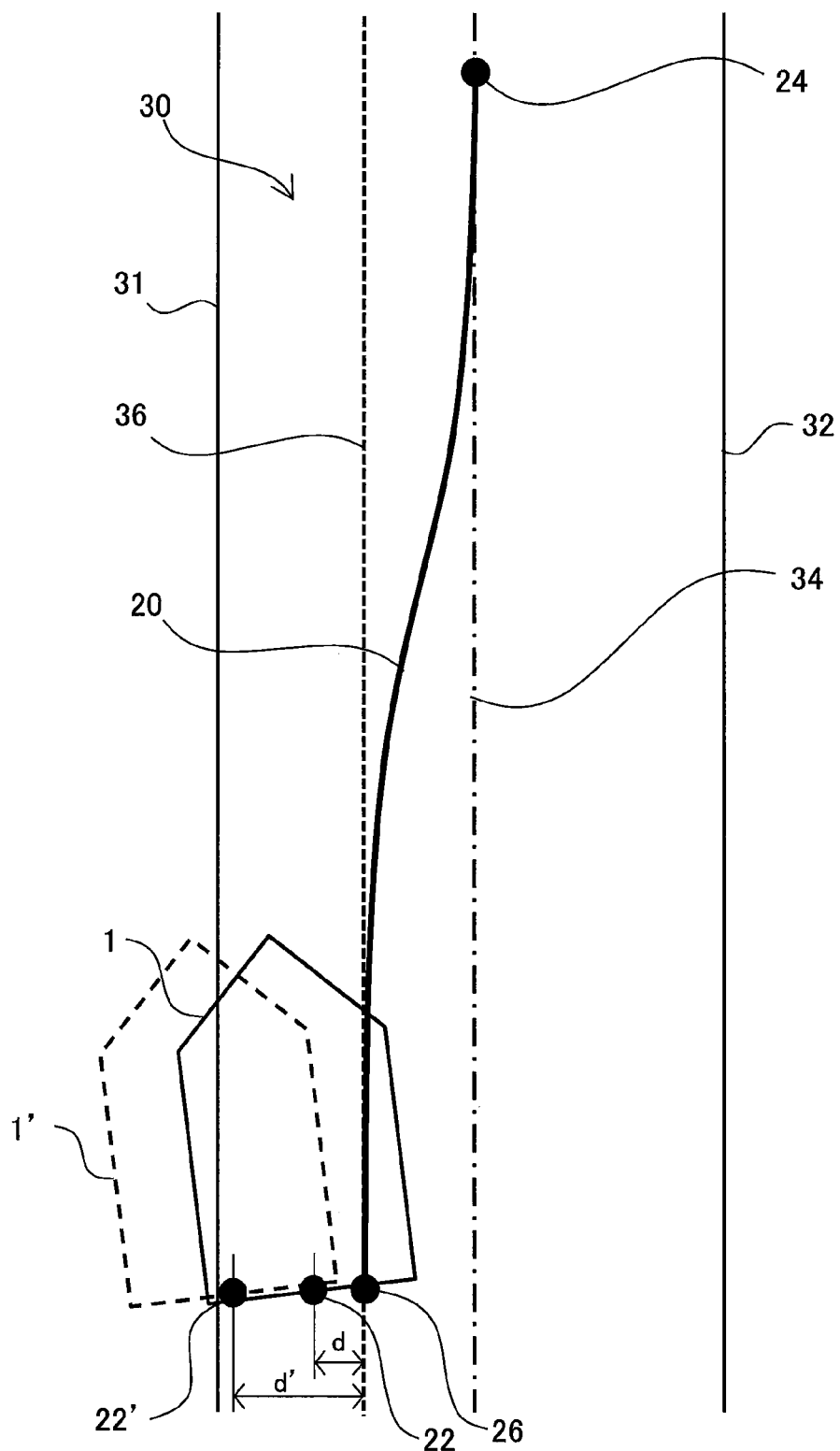

How to generate a traveling track by the traveling track generation unit 14 and the effect thereof will be described by using FIGS. 2 and 3. FIGS. 2 and 3 show the positional relation between the vehicle 1 on the reference coordinate system, the lane markers 31, 32 defining the traveling lane 30, the target path 34 and the threshold line 36. The reference coordinate system is a coordinate system with the widthwise direction of the traveling lane as the horizontal axis and the extending direction of the traveling lane as the vertical axis. The reference coordinate system is updated in accordance with the movement of the vehicle 1 so that a base point 22 set on the vehicle 1 is always on the horizontal axis of the reference coordinate system. Note that the base point 22 is a point indicating the traveling position of the vehicle 1. In the present embodiment, the based point 22 is set on the center of the rear end of the vehicle 1. Hereafter, the base point 22 will be referred as the traveling position 22 of the vehicle 1.

In FIGS. 2 and 3, the traveling position 22 of the vehicle 1 deviates from the target path 34 due to the steering intervention by the driver. However, although FIG. 2 shows an example that the traveling position 22 of the vehicle 1 doesn't deviate outside from the threshold line 36, FIG. 3 shows an example that the traveling position 22 of the vehicle 1 deviates outside from the threshold line 36. The traveling track generation unit 14 changes how to generate the traveling track in accordance with the positional relation between the traveling position 22 of the vehicle 1 and the threshold line 36.

When the traveling position 22 of the vehicle 1 doesn't deviate outside from the threshold line 36, the traveling track generation unit 14 generates the traveling track 20 with the traveling position 22 of the vehicle 1 as the base point as shown in FIG. 2. That is, when calculating the traveling track function, the lateral position of the traveling position 22 of the vehicle 1 with respect to the target path 34 is used in the calculation of the coefficients $c_0, c_1, c_2, c_3, c_4, c_5$. Thereby, the traveling track 20 is generated to connect to the end point 24 on the target path 34 smoothly with the current traveling position 22 of the vehicle 1 as the base point.

The traveling track generation unit 14 calculates the traveling track function in an operation period of the vehicle traveling controller 10 and updates the position of the traveling track 20. When the predicted position after a predetermined time period that depends on the predicted path of the vehicle 1 deviates from the reference point on the traveling track 20, or when the predicted yaw angle of the vehicle 1 after a predetermined time period deviates from the tangent angle of the traveling track at the reference point, the feed-back correction amount is calculated in the calculation of the operation amount by the tracking control unit 15. However, when the traveling position 22 of the vehicle 1 doesn't deviate outside from the threshold line 36, the current traveling position 22 of the vehicle 1 is used as the base point of the traveling track 20, and thereby a deviation isn't generated between the current traveling position 22 of the vehicle 1 and the traveling track 20. Therefore, the feed-back correction amount calculated in this case is not large, and the steering reaction force acting on steering operation by the driver is suppressed.

When the traveling position 22 of the vehicle 1 deviates outside from the threshold line 36, the traveling track generation unit 14 generates the traveling track 20 with a threshold position 26 set on the threshold line 36 as the base point as shown in FIG. 3. The threshold position 26 is a point at which the threshold line 36 intersects the horizontal axis (not shown) of the reference coordinate system. When calculating the traveling track function, the lateral position of the threshold position 26 with respect to the target path 34 is used in the calculation of the coefficients $c_0, c_1, c_2, c_3, c_4, c_5$. Thereby, the traveling track 20 is generated to connect to the end point 24 on the target path 34 smoothly with the threshold position 26 as the base point.

By the traveling track 20 being generated with the threshold position 26 as the base point, the traveling position 22 of the vehicle 1 deviates from the traveling track 20. This deviation increases the feed-back correction amount calculated by the tracking control unit 15 and increases the steering reaction force acting on steering operation by the driver. The steering reaction force acting on steering operation by the driver becomes larger as the deviation d of the traveling position 22 of the vehicle 1 from the threshold line 36 increases. For example, at the traveling position 22' of the vehicle 1' shown by a dotted line in the figure, the deviation amount d' becomes larger than the deviation amount d at the position shown by a solid line, and thereby the steering reaction force acting on steering operation by driver becomes larger.

As described above, by changing how to generate the traveling track 20 in accordance with the positional relation between the traveling position 22 of the vehicle 1 and the threshold line 36, it becomes possible to call the driver's attention without making the driver feel annoyed when the vehicle 1 may deviate from the target path 34 by the intervention by the driver in steering. Concretely, until the traveling position 22 of the vehicle 1 deviates outside from the threshold line 36, the steering reaction force is suppressed to allow steering operation by the driver. Also, when the traveling position 22 of the vehicle 1 deviates outside from the threshold line 36, it is possible to notify the driver of the deviation of the vehicle 1 from the target path 34 effectively by the steering reaction force increasing in accordance with the deviation amount.

4. Specific Routine to Generate Traveling Track

Figure 4:
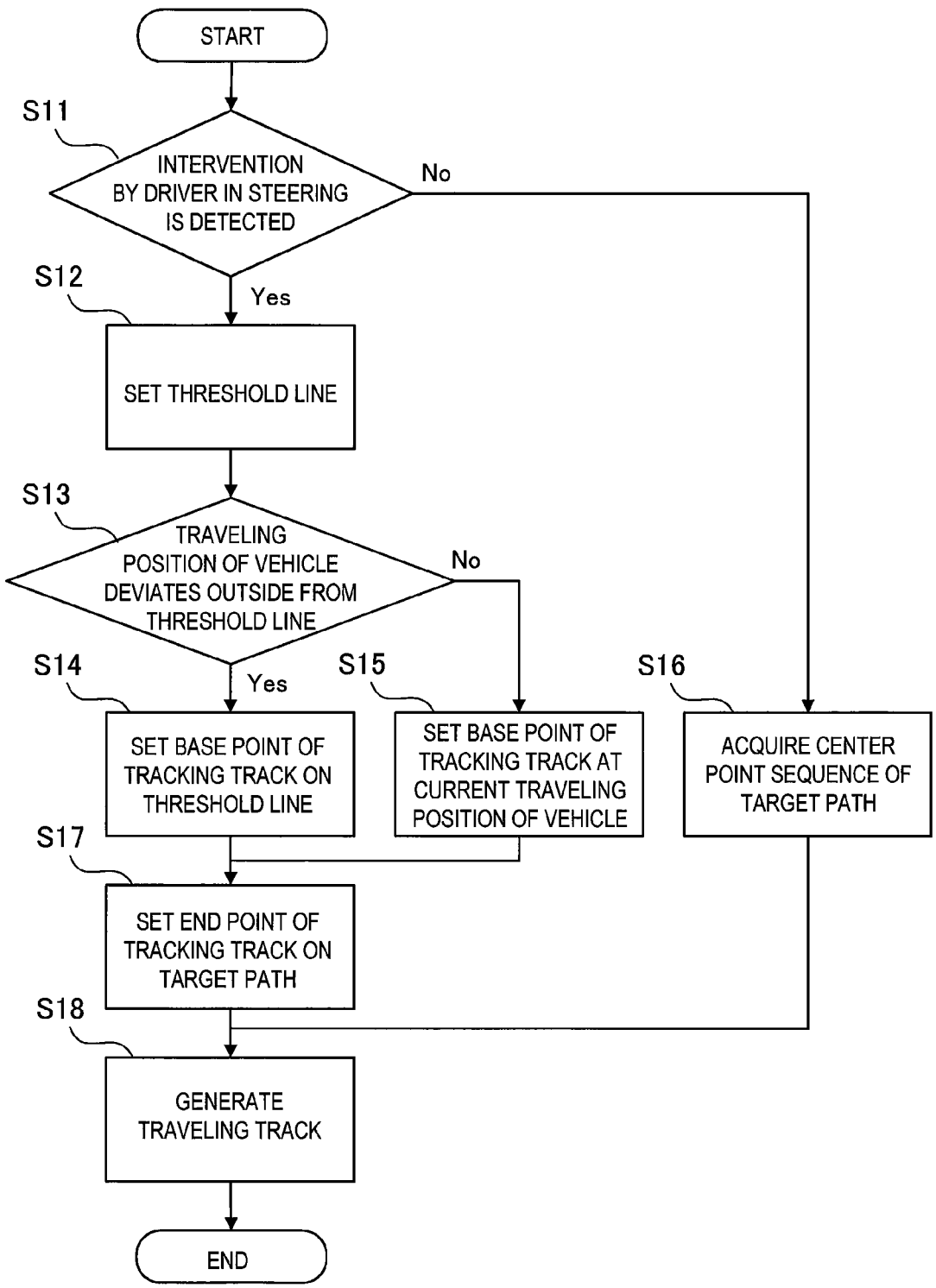
FIG. 4 is a flowchart showing a specific routine to generate the traveling track.

FIG. 4 is a flowchart showing a specific routine for the traveling track generation unit 14 to generate the traveling track 20. The traveling track generation unit 14 executes the routine shown in this flowchart in the operation period of the vehicle traveling controller 10.

First, in step S11, it is determined whether or not the intervention by the driver in steering is detected by the steering intervention detection unit 13. When the intervention by the driver in steering is detected, the routine proceeds to step S12.

In step S12, setting of the threshold line 36 is executed. How to set the threshold line 36 will be described later. In step S13, it is determined whether or not the traveling position 22 of the vehicle 1 deviates outside from the threshold line 36. When the traveling position 22 of the vehicle 1 deviates outside from the threshold line 36, the routine proceeds to step S14. In step S14, the threshold position 26 on the threshold line 36 is set as the base point of the traveling track 20 (refer to FIG. 3).

When it is determined that the traveling position 22 of the vehicle 1 doesn't deviate outside from the threshold line 36 in step S13, the routine proceed to step S15. In step S15, the current traveling position 22 of the vehicle 1 is set as the base point of the traveling track 20 (refer to FIG. 2).

After processing in step S14 or step S15, the routine proceeds to step S17. In step S17, the end point 24 of the traveling track 20 is set on the target path 34. After processing in step S17, the routine proceeds to step S18. In step S18, the traveling track 20 is generated so as to connect the base point set in step S14 or step S15 with the end point set in step S17 smoothly.

When the intervention by the driver in steering isn't detected in step S11, the routine proceeds to step S16. When the driver doesn't intervene in steering, the vehicle 1 travels along the target path 34 and the traveling position 22 of the vehicle 1 is on the target path 34. Thus, a center point sequence of the target path 34 is acquired in step S16. After processing in step S16, the routine proceeds to step S18. In step S18, the traveling track 20 is generated by connecting the center point sequence of the target path 34 acquired in step S16.

5. Setting of Threshold Line

The threshold line 36 can be set arbitrary in accordance with a traveling environment of the vehicle 1. For example, in a traveling environment where suppressing the deviation of the vehicle 1 from the target path 34 is required, the threshold line 36 may be set with a fixed distance from the target path 34 to the outer direction in the lane width direction. As the time required for the vehicle 1 to travel from the target path 34 to the threshold line 36 depends on the speed of the vehicle 1, the distance from the target path 34 to the threshold line 36 may be changed in accordance with the speed of the vehicle 1.

In a traveling environment where preventing the vehicle 1 from approaching to the lane marker 31 is required, the threshold line 36 may be set with a fixed distance from the lane marker 31 to the inner direction in the lane width direction. The distance between the lane marker 31 and the threshold line 36 may be changed in accordance with a kind of the lane marker 31. For example, if the lane marker 31 is a lane boundary, the distance between the threshold line 36 and a yellow lane boundary may be longer than the distance between the threshold line 36 and a white lane boundary. The distance between the lane marker 31 and the threshold line 36 may be changed in accordance with the speed of the vehicle 1.

Figure 5:
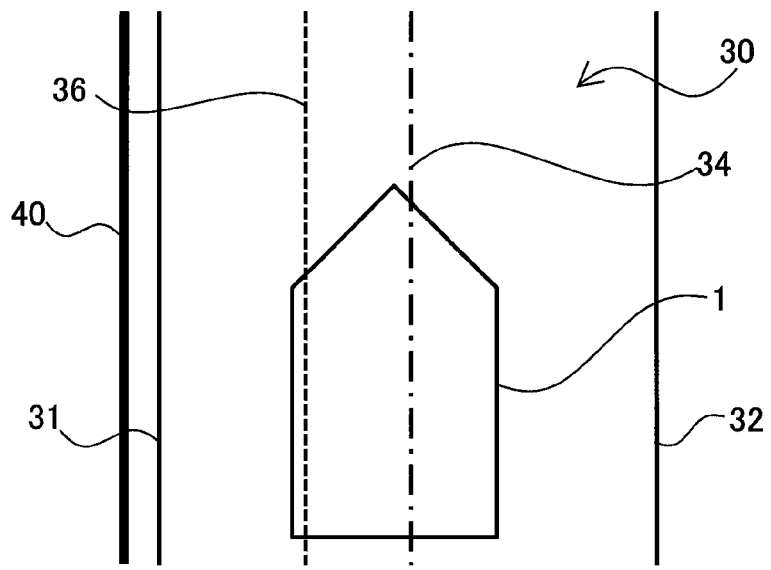
FIGS. 5 and 6 are diagrams illustrating examples of setting of the threshold line.

Also, when the lane marker 31 is a lane outside line, a road structure 40 may be provided outside the lane marker 31 as shown in FIG. 5. The road structure 40 includes, for example, a guard rail, a wall, a curb stone and the like. In this case, the threshold line 36 may be set based on the position of the road structure 40. For example, a line separated by a fixed distance from the road structure 40 may be set as the threshold line 36. The distance between the threshold line 36 and the road structure 40 may be changed in accordance with the speed of the vehicle 1. When the peripheral environment recognition unit 12 recognizes people, animals and so on, the threshold line 36 may be set based on them in order to prevent the vehicle 1 from contacting with them.

Figure 6:
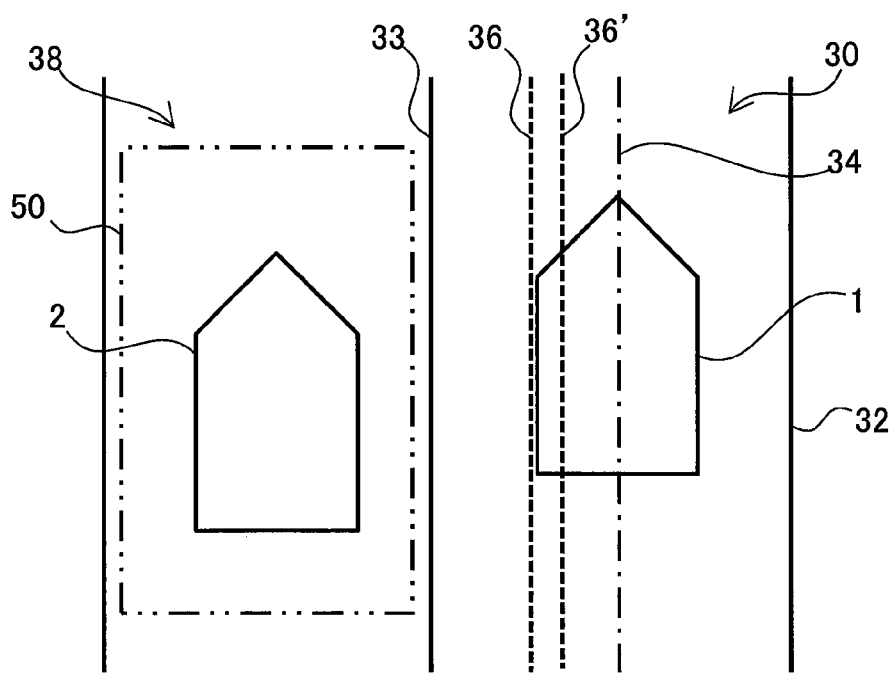

Further, the position of the threshold line 36 may be changed in according with the presence or absence of another vehicle 2 in the periphery of the vehicle 1. In the example shown in FIG. 6, another vehicle 2 is traveling on the adjacent lane 38 adjacent to the traveling lane 30 across the lane boundary 33. The vehicle 1 deviating outside from the lane boundary 33 in such a case is dangerous compared with the case where another vehicle 2 is not traveling in the adjacent lane 38. Then, a detection range 50 may be set in the adjacent lane 38 and the position of the threshold line 36 may be changed depending on whether or not another vehicle 2 is in the detection range 50. For example, the threshold line 36' set in a case where another vehicle 2 is in the detection range 50 may be set apart from the lane boundary 33 more than the threshold line 36 set in a case where another vehicle 2 isn't in the detection range 50.

The vehicle traveling controller 10 may has a function of issuing an alert when the traveling position 22 of the vehicle 1 deviates outside from the lane marker 31, 33. In this case, the threshold line 36 may be set at a position where the steering reaction force acts on the driver before the alert being issued.

6. Exceptions in Deviation Determination for Setting Traveling Track Base Point

In the above described embodiment, setting of the base point of the traveling track 20 is changed depending on whether or not the traveling position 22 of the vehicle 1 deviates outside from the threshold line 36. However, when the deviation of the traveling position 22 of the vehicle 1 from the target path 34 is caused by the driver's intention, the steering reaction force generated by changing the setting of the base point of the traveling track 20 interrupts the driver's intentional steering. Then, in a condition where the deviation of the traveling position 22 of the vehicle 1 from the target path 34 can be performed by the driver intentionally, the traveling track 20 may be generated with the traveling position 22 of the vehicle 1 as the base point irrespective of the positional relation between the traveling position 22 of the vehicle 1 and the threshold line 36.

Figure 7:
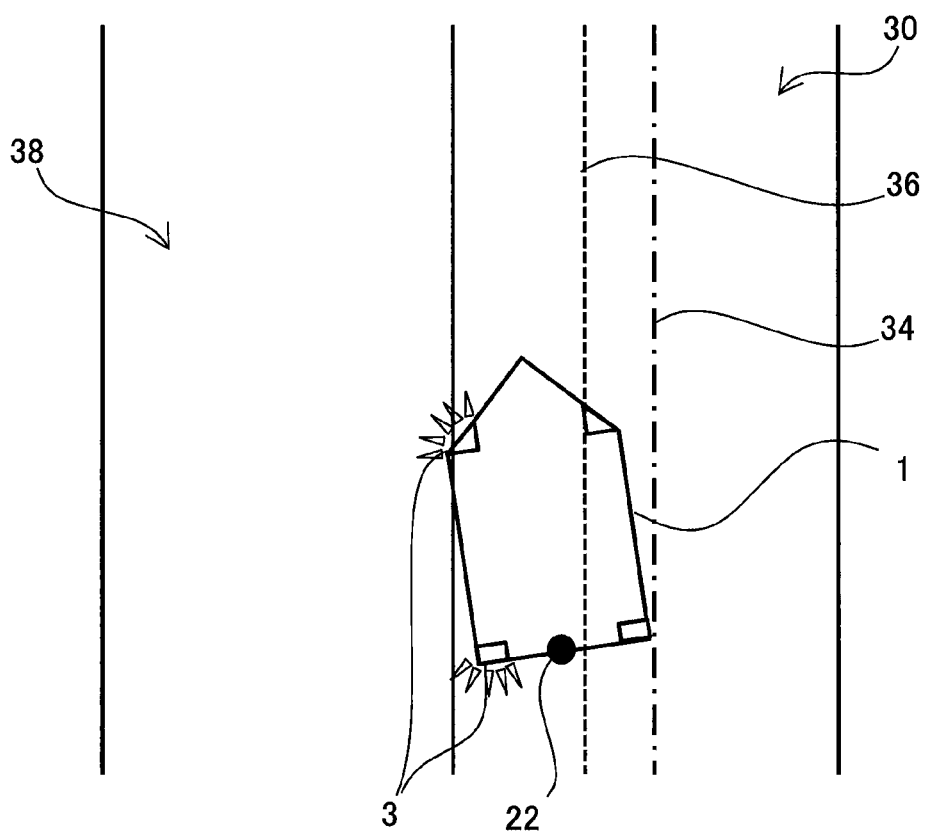
FIGS. 7 and 8 are diagrams illustrating exceptions in a deviation determination for setting a traveling track base point.

As an example of the intentional deviation of the traveling position 22 of the vehicle 1 from the target path 34, a lane change can be cited. As shown in FIG. 7, when the vehicle 1 is steered from the traveling lane 30 toward the adjacent lane 38 and the direction indicator 3 indicating the steering direction is lighting, there is a high possibility that the driver performs the intentional deviation of the traveling position 22 of the vehicle 1 from the target path 34 to try the lane change. Therefore, when the direction indicator 3 is operated so as to indicate the steering direction of the driver, the traveling track may be generated with the traveling position 22 of the vehicle 1 as the base point so as to suppress the steering reaction force acting on steering operation by the driver. This allows the driver to steer the vehicle to the intended direction without being disturbed by the steering reaction force.

Figure 8:
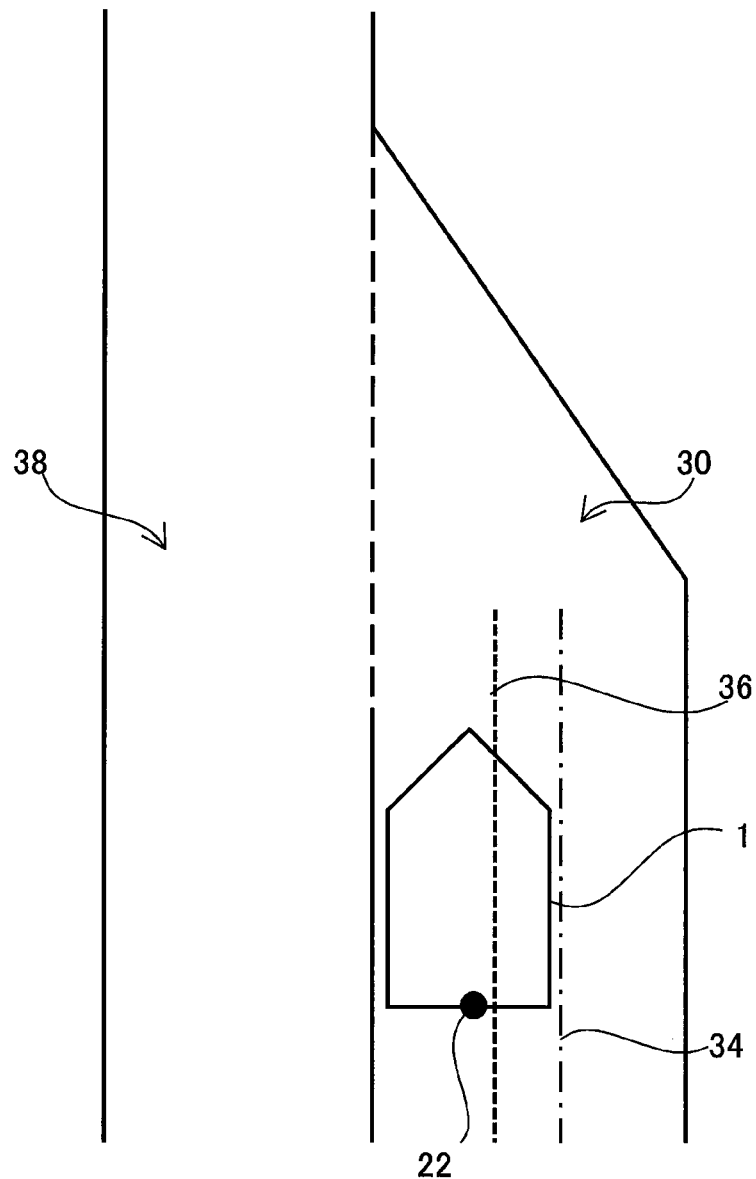

Further, as shown in FIG. 8, when a road shape in front of the vehicle 1 is a junction or a lane decreasing point, it is necessary to perform the lane change from the traveling lane 30 to the adjacent lane 38. When the traveling position 22 of the vehicle 1 deviates from the target path 34 under such the road shape, it can be presumed that the deviation is performed by the driver intentionally even if the direction indicator 3 is not operated, and therefore, the traveling track may be generated with the traveling position of vehicle 1 as the base point so as to suppress the steering reaction force acting on steering operation by the driver. This allows the driver to steer the vehicle to the intended direction without being disturbed by the steering reaction force.

What is claimed is:

1. A vehicle traveling controller that is configured to perform automatic steering so that a vehicle travels along a target path, the vehicle traveling controller comprising:
   at least one processor; and
   at least one memory coupled to the at least one processor, the at least one memory including at least one computer-executable program that, upon execution, causes the at least one processor to:
      allow a driver to intervene in steering; and
      when the driver intervenes in steering such that a traveling position of the vehicle deviates outside of a threshold line set apart from the target path in a lane width direction, increase a steering reaction force acting on a steering operation by the driver,
   wherein a setting of a position of the threshold line is changed in accordance with a traveling environment of the vehicle and a determination of whether another vehicle, traveling in an adjacent lane, is detected within a detection range,
   wherein the setting of the position of the threshold line is changed such that when it is determined that the another vehicle, traveling in the adjacent lane, is detected within the detection range, the threshold line is set further apart from a lane boundary than when it is not determined that the another vehicle, traveling in the adjacent lane is detected within the detection range.

2. The vehicle traveling controller according to claim 1, wherein the at least one computer-executable program, upon execution, further causes the at least one processor to increase the steering reaction force in accordance with a deviation of the traveling position of the vehicle from the threshold line.

3. The vehicle traveling controller according to claim 2, wherein the at least one computer-executable program, upon execution, causes the at least one processor to:

generate a traveling track for converging the traveling position of the vehicle to the target path; and perform tracking control to make the vehicle track the traveling track, wherein the generation of the traveling track includes generating the traveling track on the basis of the traveling position of the vehicle when the driver intervenes in steering, while the traveling position of the vehicle does not deviate outside from the threshold line; and generating the traveling track on the basis of a threshold position set on the threshold line when the driver intervenes in steering and the traveling position of the vehicle deviates outside from the threshold line.

4. The vehicle traveling controller according to claim 3, wherein the generation of the traveling track includes, in a case where a direction indicator is operated in a steering direction of the driver, generating the traveling track on the basis of the traveling position of the vehicle irrespective of a positional relation between the traveling position of the vehicle and the threshold line.

5. The vehicle traveling controller according to claim 3, wherein the generation of the traveling track includes, in a case where a road shape in front of the vehicle is a road shape requiring a lane change from a traveling lane, generating the traveling track on the basis of the traveling position of the vehicle irrespective of a positional relation between the traveling position of the vehicle and the threshold line.

\* \* \* \* \*